United States Patent
Kadrmas

(10) Patent No.: US 7,503,202 B1
(45) Date of Patent: Mar. 17, 2009

(54) DESIGN TECHNIQUE FOR SELECTING A BITUMINOUS MIXTURE FOR USE IN A HOT IN-PLACE RECYCLING PROCESS

(75) Inventor: Arlis Kadrmas, Wichita, KS (US)

(73) Assignee: SenMaterials, L.P., Tulsa, OK (US)

( * ) Notice: Subject to any disclaimer, the term of this patent is extended or adjusted under 35 U.S.C. 154(b) by 16 days.

(21) Appl. No.: 11/842,452

(22) Filed: Aug. 21, 2007

(51) Int. Cl.
*E01C 23/01* (2006.01)

(52) U.S. Cl. .............................................. 73/8; 404/17

(58) Field of Classification Search .............. 73/8; 404/17, 77, 94
See application file for complete search history.

(56) References Cited

U.S. PATENT DOCUMENTS

| | | | |
|---|---|---|---|
| 2003/0194273 A1* | 10/2003 | Lloyd | 404/83 |
| 2004/0247388 A1* | 12/2004 | Lloyd | 404/17 |
| 2005/0175412 A1* | 8/2005 | Lloyd | 404/77 |
| 2006/0104716 A1* | 5/2006 | Jones | 404/77 |
| 2007/0098496 A1* | 5/2007 | Hall et al. | 404/94 |
| 2008/0060551 A1* | 3/2008 | Crews et al. | 106/277 |
| 2008/0069638 A1* | 3/2008 | Crews et al. | 404/17 |
| 2008/0226392 A1* | 9/2008 | Lloyd | 404/72 |

\* cited by examiner

*Primary Examiner*—Andre J Allen
(74) *Attorney, Agent, or Firm*—Head, Johnson & Kachigian P.C.

(57) ABSTRACT

A method of reconstructing a road by selecting a bituminous mixture for repairing a paved surface and re-paving the surface using a hot in-place recycling process. Selection includes adding and mixing various types and amounts of bitumens with a reclaimed sample of the paved surface to form mixtures, compacting the mixtures to form test specimens with air voids within about 1-3% of the air voids of the paved surface or density within 10-20% of the density of the paved surface, and measuring the rheology of the specimens, preferably by a tensile strength procedure. Selecting bitumen content based on the rheology of the tested specimens. Re-paving the surface by milling the surface to a depth of about 1.5-8 inches, mixing the selected bitumen with the milled surface, and paving the surface with the paving mixture thus formed.

46 Claims, No Drawings

DESIGN TECHNIQUE FOR SELECTING A BITUMINOUS MIXTURE FOR USE IN A HOT IN-PLACE RECYCLING PROCESS

BACKGROUND OF THE INVENTION

1. Field of the Invention

The present invention relates to reconstructing and paving roads. More specifically, the present invention includes a design technique for selecting a bituminous mixture for use in a hot in-place recycling process. The present invention also includes using the selected bituminous mixture to re-pave a surface.

2. Description of Related Art

Traditionally, when roads are rehabilitated, material is milled and removed. Then, asphalt is brought to the construction site and placed on the milled area. One disadvantage with such a process is that it is time-consuming because it requires two operations. In one operation, the road is milled up, and the material is removed. Then, in the second operation, the hot mix asphalt is transported to the site and placed on the milled pavement. Another disadvantage with such a process is that the milled material often is not reused.

More recently, roads that are in fair or poor condition have been replaced or rehabilitated using in-place recycling of the bituminous material that makes up the road. However, these processes lack thorough designs and thus have consistency problems, such as inconsistency in bitumen content. Many times they do not provide the desired performance. Still further, many roads made with conventional in-place recycling processes that lack thorough designs are unreliable, and many times this leads to raveling, potholes, rutting, disintegration problems, and cracks.

In order to overcome these disadvantages, a process that provides better road performance while using recycled materials is needed.

BRIEF SUMMARY OF THE INVENTION

It is an object of the present invention to provide a hot in-place recycling method that provides a paved surface with good performance so that stressed pavement can be rehabilitated.

According to the present invention, the foregoing and other objects are achieved by a method of reconstructing a paved surface of the present invention. This method includes selecting a bituminous mixture for the reconstruction process and re-paving the surface using the selected bituminous mixture with a hot in-place recycling process. Hot in-place recycling (HIR) involves heating the paved surface in-situ, then removing the heated surface which is mixed with additional hot asphalt before being reapplied to the roadway and compacted. The selection aspect of the present invention includes adding bitumen to a reclaimed sample of the paved surface, mixing the sample and the bitumen so as to form a mixture, compacting the mixture so as to form at least one test specimen having air voids within about 3% of the air voids of the paved surface, more preferably within 2% of the air voids of the paved surface and most preferably within 1% of the air voids of the paved surface, or compacting the mixture within about 20% of the density of the original paved surface, more preferably within about 15% of the density of the original paved surface and most preferably within about 10% of the density of the original paved surface, and measuring the rheology of the specimen. Bitumen content, including amount and type of bitumen, is selected for the hot in-place recycling process based on the rheology of the tested specimen. The re-paving aspect of the present invention includes first milling the paved surface to a depth of about between about 1.5 and 8 inches, or more preferably to a depth of between about 1.5 and 6 inches, or still more preferably to a depth of between about 1.5 and 4 inches, or most preferably to a depth of between about 1.5-3 inches; then mixing the selected bitumen with the milled paved surface to form a paving mixture; and paving the surface with the paving mixture to form a re-paved surface.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention includes a method of reconstructing a paved surface, such as a road. One aspect of the present invention includes selecting a bituminous mixture for re-paving a paved surface. Another aspect of the present invention includes using the selected bituminous mixture to re-pave the paved surface using a hot in-place recycling process.

In the method of the present invention, a sample of pavement from the surface to be re-paved is obtained and reclaimed so as to form aggregate-sized particles. The bituminous mixture selection process includes adding bitumen to a sample of the reclaimed pavement. Preferably, the sample of reclaimed pavement is combined with the bitumen at a temperature of at least about 125° F., more preferably at a temperature of at least about 150° F., and most preferably at a temperature of at least about 175° F.

The term "bitumen" is meant to be construed broadly. Bitumen includes, but is not limited to, asphalt, cut-back asphalts and emulsions. Preferably, the bitumen used in the method of the present invention is a bituminous emulsion.

This reclaimed pavement is mixed with bitumen so as to create a bituminous mixture that can serve as a test specimen in a laboratory. Preferably, the mixing step continues until the mixture has cooled to about 175-225° F.

One unique aspect of the design procedure of the present invention is the use of test specimens having air voids that substantially match the existing air voids of the old pavement or having densities that substantially match the existing density of the old pavement. This can be accomplished by utilizing the following steps: The air voids in the surface that is desired to be re-paved are measured or the density of the surface that is desired to be re-paved is measured. Then, a laboratory test specimen is created from the reclaimed pavement and bitumen mixture and then is compacted until the air voids of the specimen are within about 3% of the air voids of the paved surface, more preferably within 2% of the air voids of the paved surface and most preferably within 1% of the air void measurement of the old pavement or compacted until the mixture is within about 20% of the density of the original paved surface, more preferably within about 15% of the density of the original paved surface and most preferably within about 10% of the density of the original paved surface. Therefore, if the existing pavement has 6.5% air voids, the preferred embodiment are within 1% or is between 5.5% and 6.5% air voids.

Preferably, the reclaimed pavement is combined with various bitumen amounts and compositions so as to create multiple mixtures that can serve as multiple laboratory test specimens. Then, each specimen should be compacted so as to have air voids within about 3% of the air voids of the paved surface, more preferably within 2% of the air voids of the paved surface and most preferably within 1% of the existing air voids in the surface desired to be re-paved or compacted within about 20% of the density of the original paved surface, more preferably within about 15% of the density of the original paved surface and most preferably within about 10% of the density of the original paved surface.

It is important to the present invention that the laboratory specimens created have substantially the same air voids as the air voids in the surface to be repaved or have substantially the same density as the surface to be repaved. By using specimens having substantially the same air voids as the air voids in the surface to be repaved or having substantially the same density as the density of the surface to be repaved, the results of tests performed on the specimens better predict behavior in the field. This, in turn, allows better bituminous mixtures to be designed and selected for re-paving the surface.

The specimens' rheology is tested. Rheology can include moisture resistance testing, flow and deformation testing, etc. Preferably, the rheology is tested by testing the strength of the specimen. Most preferably, the strength test is a tensile strength procedure. This test provides an indication of cohesive strength.

Moisture resistance can also be measured on at least one specimen using a tensile strength ratio. This ratio is the strength of a soaked specimen to the strength of a dry specimen. Preferably, an AASHTO/ASTM procedure commonly referred to as the Lottman test is followed.

Bitumen content, including amount and type of bitumen, is selected for the hot in-place recycling process based on the rheology of the specimens tested. Preferably, bitumen content and rheological properties are selected based on the strength of the various specimens. Most preferably, bitumen content is selected based on the tensile strength of the various specimens.

Preferably, one or more specimens also are tested for rutting. Preferably, an Asphalt Pavement Analyzer (APA) rut test is performed. The APA test involves compacting 150 mm specimens and placing them in a device that has a pressurized rubber hose. The hose is then rolled over the specimen by a wheel. The rutting test may be done to verify performance at a defined bitumen content based on the rheology of the specimens. Alternatively or in addition to selecting based on rheology, the amount of bitumen selected for use in the hot in-place recycling process may be based on the rutting performance of the specimens.

Preferably, one or more specimens also are tested for crack resistance. Preferably, an indirect tensile test is used to test crack resistance. Preferably, AASHTO procedures for an indirect tensile test are followed. The crack resistance test may be done to verify performance at a defined bitumen content based on the rheology of the specimens. Alternatively or in addition to selecting based on rheology, the amount of bitumen selected for use in the hot in-place recycling process may be based on the crack resistance of the specimens.

The re-paving aspect of the present invention includes milling the heated paved surface to a depth of between about 1.5 and 8 inches, or more preferably to a depth of between about 1.5 and 6 inches, or still more preferably to a depth of between about 1.5 and 4 inches, or most preferably to a depth of between about 1.5-3 inches, mixing the selected bitumen with the milled paved surface to form a paving mixture, and paving the surface with the paving mixture to form a re-paved surface.

Preferably, the paved surface is heated to above about 125° F., more preferably to above about 150° F., and most preferably above about 175° F. before the milling step. The paved surface is heated in-situ employing a hot plate specially designed for this purpose. Preferably, the paved surface is milled to a depth of at least about 2 inches.

The re-paved surface is compacted before it has completely cooled. Preferably, it is compacted while it is at a temperature below about 250° F. Most preferably, the temperature is about 175-225° F.

Preferably, after the surface has been re-paved, properties of the re-paved surface are measured. Its rheology is compared with the rheology of the tested specimen. Preferably, the tensile strength of the re-paved surface is at least about 80% of the tensile strength of a desirable specimen. The preferred field test is to sample the loose heated, milled, and mixed material and compact it on the side and then test the compacted specimen.

Preferably, the density of the re-paved surface also is measured. The density of a sample of this re-paved surface is compared with the density of the tested specimen. Preferably, the density of the sample is at least about 94% of the density of a desirable specimen.

Preferably, the density of the re-paved surface is compared with the density of the original paved surface. Still further, preferably, the re-paved surface is compacted so that the re-paved surface has air voids within about 3% of the air voids of the paved surface, more preferably within 2% of the air voids of the paved surface and most preferably within 1% of the air voids of the original paved surface or compacted so that the repaved surface has density within about 20% of the density of the original paved surface, more preferably within about 15% of the density of the original paved surface and most preferably within about 10% of the density of the original paved surface.

Another aspect of the present invention is the re-paved surface created from the method described above. Preferably, the re-paved surface has a thickness that is substantially similar to the depth of pavement that is milled up in the recycling process. This allows the road to remain at the same elevation.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

I claim:

1. A method of selecting a bituminous mixture for re-paving a paved surface using a hot in-place recycling process, comprising:

providing a sample of pavement that has been reduced in particle size from said paved surface;

adding bitumen to said reclaimed pavement sample;

mixing said sample and said bitumen so as to form a mixture;

compacting said mixture so as to form at least one test specimen having air voids within about 3% of the air voids of said paved surface;

measuring the rheology of said at least one specimen; and selecting bitumen content for said hot in-place recycling process based on said rheology of said at least one specimen.

2. The method of claim 1 wherein said sample of reclaimed pavement is provided at a temperature of at least about 125° F.

3. The method of claim 1 wherein said sample of reclaimed pavement is provided at a temperature of at least about 150° F.

4. The method of claim 1 wherein said sample of reclaimed pavement is provided at a temperature of at least about 175° F.

5. The method of claim 1 wherein said rheology is measured using a tensile strength procedure.

6. The method of claim 5 wherein said tensile strength procedure comprises measuring moisture resistance of said at least one specimen and calculating a tensile strength ratio.

7. The method of claim 1 further comprising:
testing rutting of said at least one specimen; and
selecting said amount of bitumen for said hot in-place recycling process based on said rutting of said at least one specimen.

8. The method of claim 7 further comprising:
testing crack resistance of said at least one specimen; and
selecting said amount of bitumen for said hot in-place recycling process based on said crack resistance of said at least one specimen.

9. The method of claim 8, wherein said crack resistance test is an indirect tensile test.

10. The method of claim 1, further comprising:
testing crack resistance of said at least one specimen; and
selecting said amount of bitumen for said hot in-place recycling process based on said crack resistance of said at least one specimen.

11. The method of claim 10 wherein said crack resistance test is an indirect tensile test.

12. The method of claim 1, wherein said at least one test specimen is at least about 125° F. after compaction.

13. The method of claim 1, wherein said at least one test specimen is at least about 150° F. after compaction.

14. The method of claim 1, wherein said at least one test specimen is at least about 175° F. after compaction.

15. The method of claim 1 wherein the mixture is compacted so as to form at least one test specimen having air voids within about 2% of the air voids of said paved surface.

16. The method of claim 1 wherein the mixture is compacted so as to form at least one test specimen having air voids within about 1% of the air voids of said paved surface.

17. A method of re-paving a paved surface using a hot in-place recycling process, comprising:
providing a sample of said paved surface that has been reclaimed;
adding bitumen to said sample of reclaimed paved surface;
mixing said sample and said bitumen so as to form a mixture;
compacting said mixture so as to form at least one specimen having air voids within approximately 3% of the air voids of said paved surface;
measuring rheology of said at least one specimen;
selecting an amount of bitumen for said hot in-place recycling process based on said rheology of said at least one specimen;
milling said paved surface to a depth of about 1.5-8 inches;
mixing said selected bitumen with said milled paved surface to form a paving mixture;
paving said surface with said paving mixture to form a re-paved surface.

18. The method of claim 17 wherein said mixture is compacted so as to form at least one specimen having air voids within approximately 2% of the air voids of said paved surface.

19. The method of claim 17 wherein said mixture is compact so as to form at least one specimen having air voids within approximately 1% of the air voids of said paved surface.

20. The method of claim 17 wherein the paved surface is milled to a depth of about 1.5-6 inches.

21. The method of claim 17 wherein the paved surface is milled to a depth of about 1.5-4 inches.

22. The method of claim 17 wherein the paved surface is milled to a depth of about 1.5-3 inches.

23. The method of claim 17 wherein said sample of said reclaimed paved surface is provided for mixing with said bitumen at a temperature of at least about 125° F.

24. The method of claim 17 wherein said sample of said reclaimed paved surface is provided for mixing with said bitumen at a temperature of at least about 150° F.

25. The method of claim 17 wherein said sample of said reclaimed paved surface is provided for mixing with said bitumen at a temperature of at least about 175° F.

26. The method of claim 17 wherein said mixing step continues until said mixture has cooled to about 175-225° F.

27. The method of claim 17, further comprising:
heating said paved surface before said milling step.

28. The method of claim 17 wherein said paved surface is milled to a depth of at least about 1.5 inches.

29. The method of claim 17 wherein said paved surface is milled to a depth of between approximately 1.5 and 8 inches.

30. The method of claim 17 wherein said paved surface is milled to a depth of between approximately 1.5 and 6 inches.

31. The method of claim 17 wherein said paved surface is milled to a depth of between approximately 1.5 and 4 inches.

32. The method of claim 17 wherein said paved surface is milled to a depth of between approximately 1.5 and 3 inches.

33. The method of claim 17 wherein rheology is measured using a tensile strength procedure.

34. The method of claim 33, further comprising:
measuring tensile strength of said re-paved surface; and
comparing said tensile strength of said at least one specimen with said tensile strength of said re-paved surface, wherein said tensile strength of said re-paved surface is at least about 80% of said tensile strength of said specimen.

35. The method of claim 17, further comprising:
measuring density of at least one specimen;
measuring density of said re-paved surface; and
comparing said density of said at least one specimen with said density of said re-paved surface, wherein said density of said re-paved surface is at least about 94% of said density of said specimen.

36. The method of claim 17, further comprising:
compacting said re-paved surface so that said re-paved surface has air voids within about 3% of the air voids of said paved surface before milling.

37. The method of claim 17, further comprising:
compacting said re-paved surface so that said re-paved surface has air voids within about 2% of the air voids of said paved surface before milling.

38. The method of claim 17, further comprising:
compacting said re-paved surface so that said re-paved surface has air voids within about 1% of the air voids of said paved surface before milling.

39. A method of re-paving a paved surface using a hot in-place recycling process, according to claim 17 further comprising:

testing rutting of said at least one specimen; and selecting said amount of bitumen for said hot in-place recycling process based on said rutting of said at least one specimen.

40. A method of re-paving a paved surface using a hot in-place recycling process, according to claim 17 further comprising:

testing crack resistance of said at least one specimen; and selecting said amount of bitumen for said hot in-place recycling process based on said crack resistance of said at least one specimen.

41. A method of selecting a bituminous mixture for re-paving a paved surface using a hot in-place recycling process, comprising:

providing a sample of pavement that has been reduced in particle size from said paved surface;

adding bitumen to said reclaimed pavement sample;

mixing said sample and said bitumen so as to form a mixture;

compacting said mixture so as that the newly paved surface is within about 20% of the density of the original paved surface to be recycled;

measuring the rheology of said at least one specimen; and selecting bitumen content for said hot in-place recycling process based on said rheology of said at least one specimen.

42. The method of claim 41 wherein said mixture is compacted so as that the newly paved surface is within about 15% of the density of the original paved surface to be recycled.

43. The method of claim 41 wherein said mixture is compacted so as that the newly paved surface is within about 10% of the density of the original paved surface to be recycled.

44. The method of claim 41 wherein said sample of reclaimed pavement is provided at a temperature of at least about 125° F.

45. The method of claim 41 wherein said sample of reclaimed pavement is provided at a temperature of at least about 150° F.

46. The method of claim 41 wherein said sample of reclaimed pavement is provided at a temperature of at least about 175° F.

* * * * *